United States Patent [19]

Sadler

[11] Patent Number: 5,231,817
[45] Date of Patent: Aug. 3, 1993

[54] POUCH COLLAPSING ASSEMBLY FOR VERTICAL FORM, FILL AND SEAL MACHINE

[75] Inventor: James W. Sadler, Toronto, Canada

[73] Assignee: E. I. Du Pont de Nemours and Company, Wilmington, Del.

[21] Appl. No.: 904,262

[22] Filed: Jun. 25, 1992

[51] Int. Cl.⁵ .............................................. B65B 9/12
[52] U.S. Cl. .................... 53/451; 53/374.8; 53/552
[58] Field of Search ................ 53/450, 451, 526, 550, 53/551, 552, 374.8

[56] References Cited

U.S. PATENT DOCUMENTS

| | | | |
|---|---|---|---|
| 2,624,992 | 1/1953 | Salfisberg | 53/551 |
| 4,348,851 | 9/1982 | Prakken | 53/552 X |
| 4,512,138 | 4/1985 | Greenwalt | 53/451 |
| 4,563,862 | 1/1986 | McElvy | 53/552 |
| 4,586,317 | 5/1986 | Bussell | 53/451 |
| 4,630,429 | 12/1986 | Christine | 53/551 X |
| 4,676,051 | 6/1987 | Hoskinson et al. | 53/451 |
| 4,947,621 | 8/1990 | Christine et al. | 53/451 |
| 4,965,986 | 10/1990 | Klinkel | 53/551 |
| 4,999,974 | 3/1991 | Kovacs et al. | 53/451 X |

FOREIGN PATENT DOCUMENTS 0381400 8/1990 European Pat. Off. .

Primary Examiner—John Sipos
Assistant Examiner—Daniel Moon

[57] ABSTRACT

A vertical form, fill and seal machine for making material-filled, slack pouches, having little or no headspace in the pouches. One jaw of the heat sealing assembly has a jaw wall convex about a vertical axis and located below the heat sealing element. The opposite jaw of the assembly has a jaw wall of an elastomeric sheet stretched under tension and adapted to cooperate with the convex jaw wall. During operation, the jaw walls bias against the material-filled pouch causing air to be expelled from the material and collapsing the tube as the jaws are closed. The machine is useful for making slack pouches filled with flowable material such as emulsions, soft margarine, food dressings, pastes, peanut butter, preserves, pie fillings, marmalade, jellies, dough, ground meat, detergents and granular solids.

8 Claims, 4 Drawing Sheets

POUCH COLLAPSING ASSEMBLY FOR VERTICAL FORM, FILL AND SEAL MACHINE

BACKGROUND OF THE INVENTION

The invention relates to a heat sealing device useful for making pouches filled with flowable materials, e.g. liquids, on so-called vertical form, fill and seal machines. It is well known to package flowable materials, for example, milk, syrups, sauces, on so-called vertical form, fill and seal machines. Using such a machine, a flat web of synthetic thermoplastic film is unwound from a roll and formed into a continuous tube in a tube forming section, by sealing the longitudinal edges of the film together to form a so-called lap seal or a so-called fin seal. The tube thus formed is pulled vertically downwards to a filling station. The tube is then collapsed across a transverse cross-section of the tube, the position of the cross-section being at a sealing device below the filling station. A transverse heat seal is made, by the sealing device, at the collapsed portion of the tube, thus making an airtight seal across the tube. The sealing device generally comprises a pair of jaws. During and after making the transverse seal a quantity of material to be packaged, e.g. liquid, is caused to enter the tube, at the filling station, and fill the tube upwardly from the aforementioned transverse seal. The tube is then caused to move downwardly a predetermined distance. Such movement may be under the influence of the weight of the material in the tube, or may be caused by pulling or mechanically driving the tube. The jaws of the sealing device are closed again, thus collapsing the tube at a second transverse section. The second transverse section may be above, usually just above, the air/material interface in the tube, or the second transverse section may be below the air/material interface. The sealing device seals and severs the tube transversely at the second transverse section. The material-filled portion of the tube is now in the form of a pillow shaped pouch. Thus the sealing device has sealed the top of the filled pouch, sealed the bottom of the next-to-be formed pouch, all in one operation. One such vertical form and fill machine of the type described above is sold under the trade mark PREPAC. With some other machines, the sealing device does not sever the tube at the second transverse section, but does sever the tube subsequently.

It is sometimes desired to produce a "slack" pouch. A slack pouch is one that has little or no "headspace", i.e. has substantially no air in the pouch, and is not filled to capacity with product. For example, slack pouches filled with refrigerated product, e.g. taco meat, are more easily reheated in conventional manners, e.g. in a pot of boiling water. It is known to make slack packages. A method of making such slack packages is shown in European Patent Application 90.300872.0, filed on 1990 Jan. 29 and published 1990 Aug. 8 under No. 0381400. In such application a vertical form, fill and seal machine is disclosed which has a constraint chute below the horizontal sealing jaws, said constraint chute comprising two vertical walls which are adapted to permit a material-filled pouch to travel therebetween, one of said walls being adapted to move away from the other wall under tension and to return to its original position, the degree of tension and the friction of said walls being sufficient to squeeze said pouch therebetween and to permit said pouch to travel therebetween without undue restraint, the plane of both of said walls being substantially perpendicular to the direction of closing of said jaws. Practically, it has been found, such an arrangement is not entirely satisfactory for food-containing pouches, because the pouches do not have sufficient slackness to enable them to be quickly heated when placed in a pot of boiling water. For example, when using such a constraint chute, pouch thicknesses of about 40 to 50 cm are possible. Such pouches may take 40 minutes to heat in boiling water. The present invention is directed to the addition of a simple device for making a slacker package on a vertical form, fill and seal machine. Pouch thicknesses of about 25 cm are achievable, which permit heating of the pouch within about 25 minutes.

SUMMARY OF THE INVENTION

Accordingly, the present invention provides a vertical form, fill and seal machine, for making material-filled pouches, which machine has first and second transverse heat sealing jaws with at least one of said jaws being capable of transverse motion and adapted to collapse a tubular film, horizontally, as the tube passes between said jaws, said pouch being formed by transversely heat sealing a material-filled tubular synthetic thermoplastic film at intervals, using said jaws to form said seals, the improvement comprising a first lower jaw wall adapted to move in concert with said first jaw and a second jaw wall adapted to move in concert with said second jaw, said first and second transverse heat sealing jaws and said first and second lower jaw walls having widths parallel to the vertical axis of the vertical form, fill and seal machine and lengths transverse to said widths, the first lower jaw wall being convex in the transverse direction, and the second lower jaw wall comprising an elastomeric sheet held under tension in the transverse direction, said first and second lower jaw walls having a width of from 5 to 20 cm.

In one embodiment the elastomeric sheet is made of pure gum rubber.

In another embodiment the elastomeric sheet is held under tension of from 0.8 to 5.5 N/cm width, especially 1.0 to 5.0 N/cm.

In a further embodiment the elastomeric sheet is from 1 to 6 mm thick, especially from 1 to 3 mm.

In yet another embodiment the elastomeric sheet has a low modulus, preferably from 0.7 to 1.8 N/cm/cm width.

In another embodiment the lower jaw walls depend from corresponding heat sealing jaws.

In yet another embodiment there is a constraint chute below said jaws, said constraint chute comprising two vertical walls which are adapted to permit a material-filled pouch to travel therebetween, and said lower jaw walls are between said jaws and said constraint chute.

A further aspect of the invention provides a process for making a slack pouch using a vertical form, fill and seal machine, for making material-filled pouches, which machine has a first and second transverse heat sealing jaws with at least one of said jaws being capable of transverse motion and adapted to collapse a tubular film, horizontally, as said tube passes between said jaws, one of said jaws having a heat sealing element for transversely sealing said tube, said machine also having a first lower jaw wall adapted to move in concert with the first heat sealing jaw and a second lower wall adapted to move in concert with the second heat sealing jaw, said first and second transverse heat sealing jaws and said first and second lower jaw walls having widths parallel to the vertical axis of the vertical form, fill and seal machine and lengths transverse to said widths, the first lower jaw wall being convex in the transverse direction, and the second lower jaw wall comprising an elastomeric sheet held under tension in the transverse direction, said first and second lower jaw walls having a width of from 5 to 20 cm, said process comprising:

i) transversely heat sealing said tubular film at a first transverse seal;

ii) advancing said tubular film downwardly;

iii) filling said transversely sealed tubular film upwardly with a flowable material such that the top of the flowable material is below the heat sealing element, and such that there is air in the tube between the top of the flowable material and the heat sealing element;

iv) causing said heat sealing jaws to move towards one another, thereby causing the lower jaw walls to move towards one another and squeeze said tube therebetween, the distance between the lower jaw walls and the degree of convexity of the first lower jaw wall and the tension in the elastomeric sheet of the second lower jaw wall having been previously adjusted such that substantially all of the air in the tube between the top of said flowable material and the heat sealing element is squeezed out of said pouch before the jaws close and the tube is transversely heat sealed.

The adjustment of the distance between the lower jaw walls and the degree of convexity of the first lower jaw wall and the tension in the elastomeric sheet of the second lower jaw wall are easily determined by simple experimentation.

As used herein the term "heat sealing element" encompasses electrical impulse sealing elements, tubular elements with hot fluids coursing therethrough and other devices capable of sealing thermoplastic films.

BRIEF DESCRIPTION OF THE DRAWING

An embodiment of the invention is illustrated in the accompanying drawings wherein.

DETAILED DESCRIPTION

Figure 1:
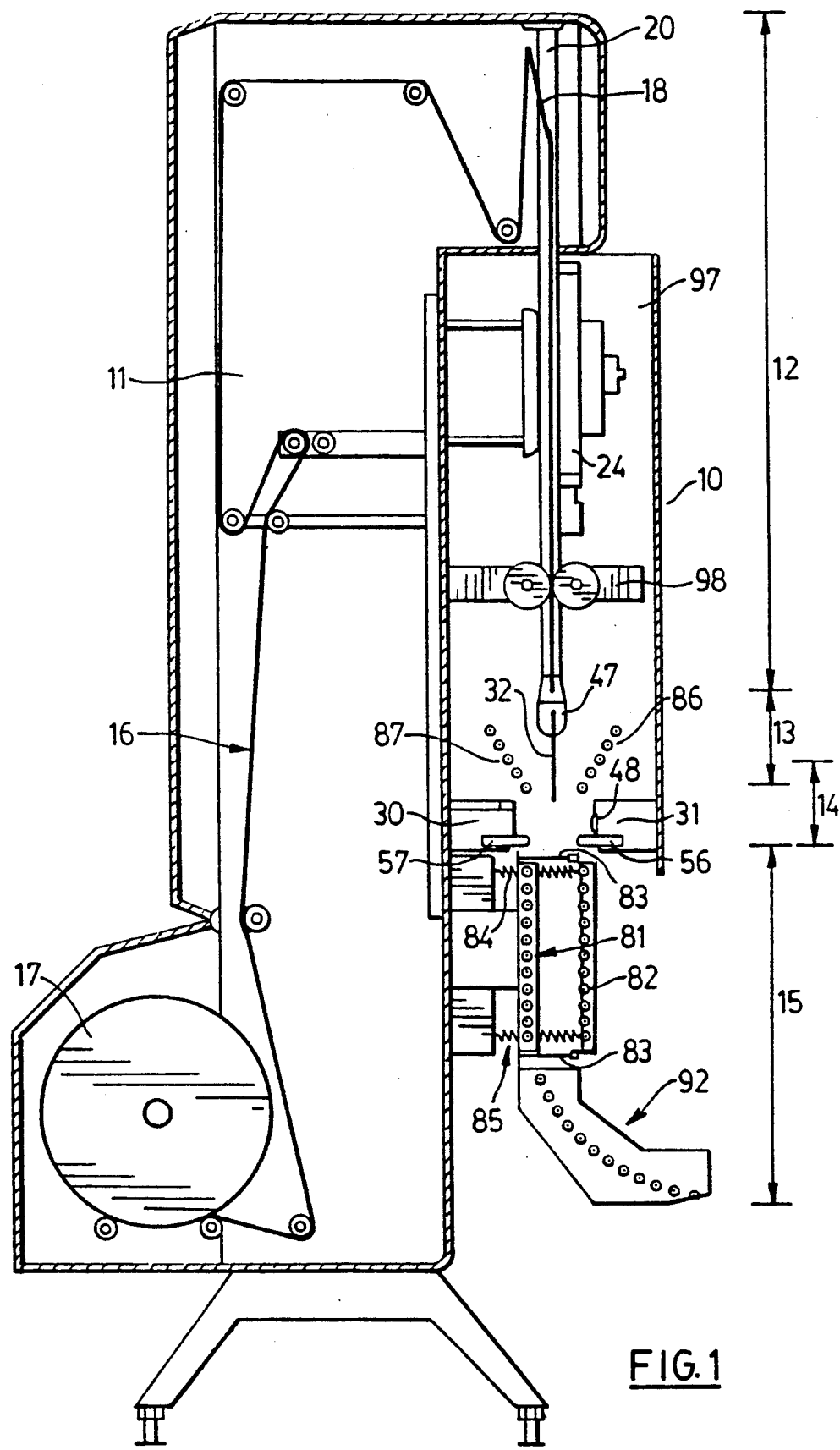
FIG. 1 is a schematic view of a vertical form, fill and seal machine incorporating embodiments of the present invention.

Referring to FIG. 1 the vertical form, fill and seal machine 10 comprises a film unwinding section 11, a tube forming section 12, a filling section 13, a pouch forming section 14 and a discharge section 15. Film 16 is unwound from roll 17 and the web of film is formed into tubular form using film folding "horn" 18 such that longitudinal edges of the film 16 overlap. The film 16, now in essentially tubular form, surrounds fill-tube 20 and a tube-forming plate (not shown). Fill tube 20 may have a heat-seal backing plate (not shown) thereon for assisting in forming a heat-sealed back seam with a vertical heat sealing jaw 24 of longitudinal heat sealing device 97.

The tubular film is prepared for entry to the gap between jaws 30 and 31 by starting to elongate the cross-section of tubular film, by means of spreader fingers (only one of which is shown, at 32).

In operation, the tubular film is advanced, downwardly, past the discharge end 47 of fill tube 20 to a transverse impulse sealer. The transverse impulse sealer comprises two jaws 30 and 31. Jaw 31 has a silicone backing pad 48 embedded therein. Jaw 30 comprises an electrical impulse sealing element 49 mounted on water-cooled block 50. A layer of polytetrafluoroethylene-impregnated glass fibre tape (not shown) separates the impulse sealer from block 50, as is known in the art. Impulse sealing element 49 may be prevented from sticking to the film 19 by interposing layers of polytetrafluoroethylene-impregnated glass fibre tape (not shown).

Figure 3:
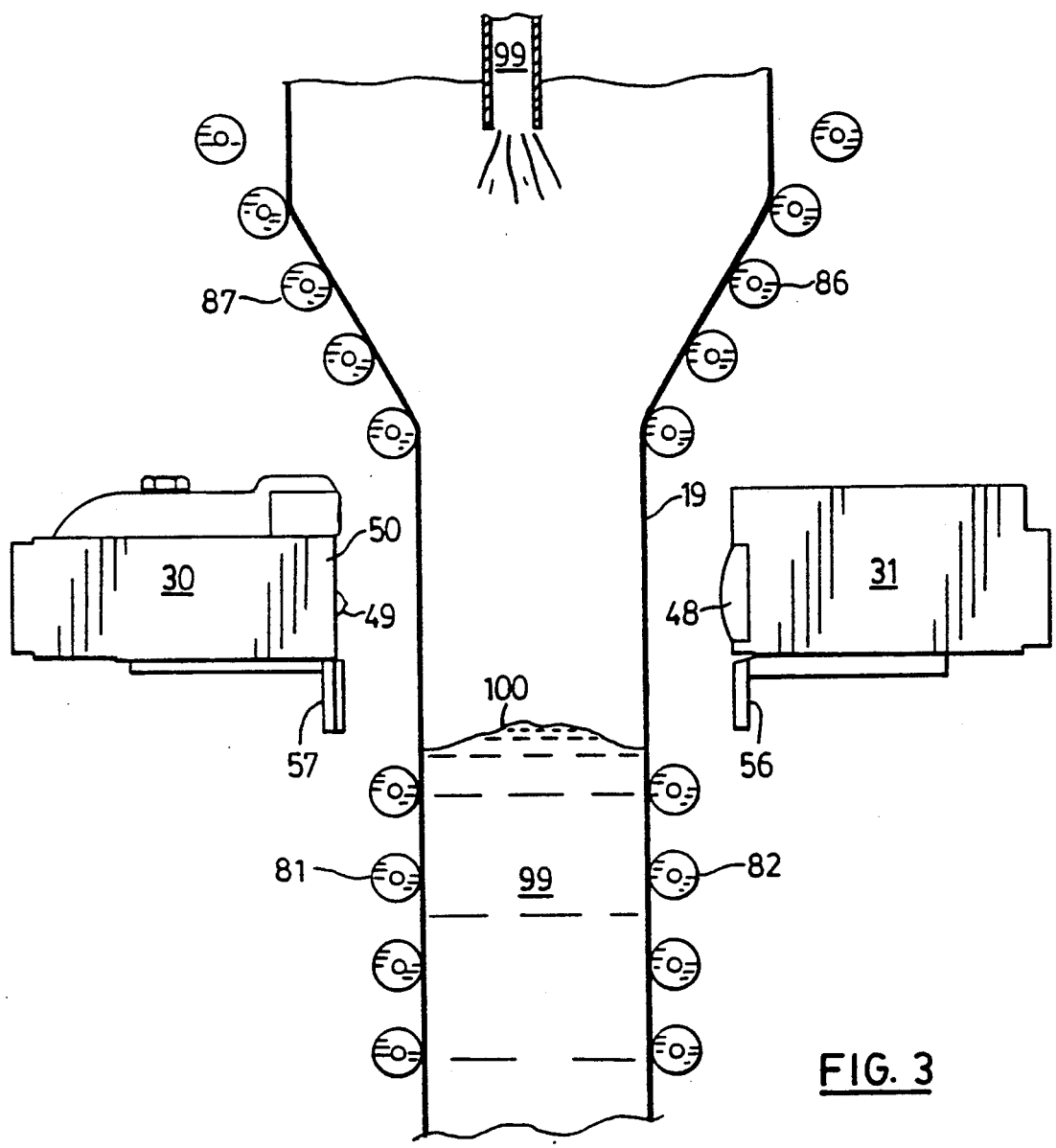
FIG. 3 is a cross-sectional view of the transverse heat sealing jaws in the open position.
Figure 4:
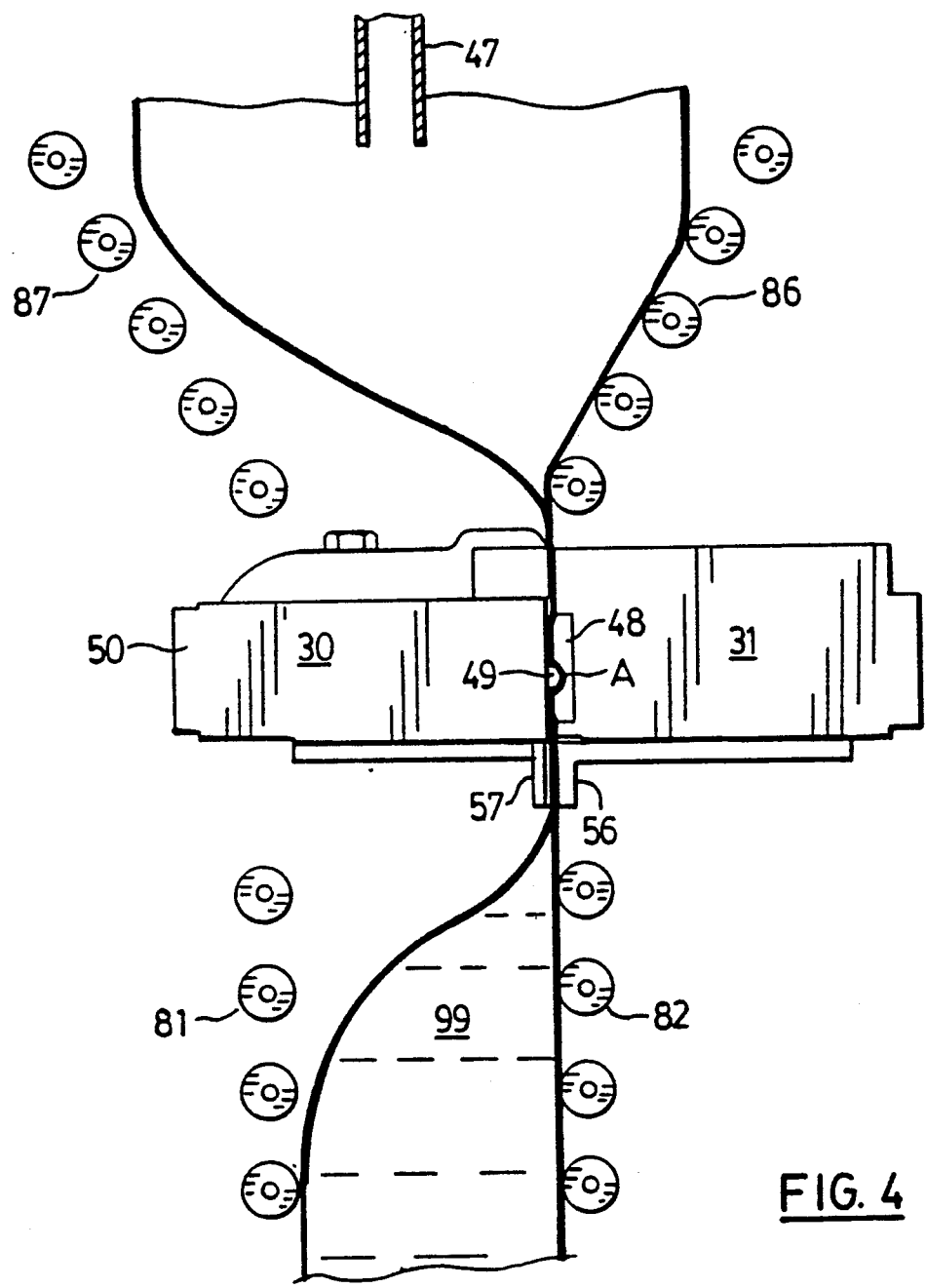
FIG. 4 is a cross-sectional view of the transverse heat sealing jaws in the closed position.

In order to assist in the production of slack pouches which are not filled to capacity, the tubular film 19 may be constrained with a chute below the heat sealing jaws, defined by roller assemblies 81 and 82 (shown in FIGS. 1, 3 and 4). This is not an essential feature of the present invention. The minimum distance between roller assemblies 81 and 82 is determined by stops 83. Springs 84 and 85 are attached to the top and bottom, respectively, of roller assembly 82. The springs 84 and 85 allow roller assembly 82 to move away from stops 83 when expansive pressure is applied between roller assemblies 81 and 82, and to return to its original position at stops 83 when the pressure is released. Further, it is preferred that when filling the tubular film with hot material, such tubular film is guided towards the gap between heat sealing jaws 30 and 31 by a narrowing chute, defined by roller assemblies 86 and 87. As a result of such guidance the tubular film is caused to be shaped into a substantially oblong cross-section.

The heat sealing element 49 seals the tubular film transversely and also severs the tubular film, so that a top heat seal and a bottom heat seal are formed on adjacent pouches. After forming the lower pouch, the pouch will be allowed to drop under its own weight, through the chute defined by roller assemblies 81 and 82 and thence via chute 92 to a pouch collection and packaging stage (not shown).

After forming the transverse seals, the upper unclosed pouch is filled with a known quantity of flowable material through fill tube 20. The flowable material is filled to a position wherein the material/air interface 100 is below the heat sealing jaws 30 and 31 as shown in FIG. 3. With viscous materials, e.g. taco meat, the material/air interface is sometimes mounded, as shown in FIG. 3.

In operation, the film 16 is allowed to unwind from roll 17 and is formed into tubular film by forming horn 18. The longitudinal edges of the film may overlap and such edges are sealed together in heat sealing device 97. The tubular film so-formed is advanced by rollers 98 and travels downwards through the throat formed with roller assemblies 86 and 87, between jaws 30 and 31 and between roller assemblies 81 and 82. Flowable material 99 is caused to flow, e.g. is gravity fed or pumped, through fill tube 20 and emanates from the end of fill tube 47. The flowable material 99 enters the tubular film and is prevented from egress from the tube by a transverse heat seal. The flow of flowable material 99 may be continuous or intermittent as is known in the art.

Sufficient flowable material is allowed to enter the tubular film so that just prior to the closing of jaws 30 and 31, the material/air interface 100 is below the heat seal line A. The slackness of the pouch is governed by the distance between roller assemblies 81 and 82 in relation to the diameter of tubular film and the width of lower jaw walls 56 and 57. The jaw lower walls move together so that the elastomeric sheet 57 tends to conform to the shape of the convex first lower jaw wall 56. In so doing substantially all of the air is expelled from the top of the pouch. Roller assembly 81 is fixed, while roller assembly 82 may be slightly pushed apart from roller assembly 81 by the lower pouch. The travel of roller assembly 82 is governed by a stop (not shown) and springs 84 and 85, or other means, e.g. pneumatic means. With respect to the selection of suitable springs, ideally the springs should be sufficiently weak to allow roller assembly 82 to be moved away from roller assembly 81 as a result of hydraulic forces within the lower pouch caused by the closing of the jaws and yet sufficiently strong to constrain the pouch when the jaws are open, in such a way that the tubular film, above its closed end, is not allowed to "balloon out" as a result of the head of material in and above the next-to-be-formed pouch. The constraining action of the roller assembly and the lower jaw walls 56 and 57 is sufficient that the lower pouch is squeezed such that after completion of the pouch, the pouch is underfilled and forms a slack package. It is preferable that the top spring 84 is weaker than the bottom spring 85 because head of material in the pouch places greater tension on the bottom spring than the top one. The ability of the roller assembly 82 to "float" is particularly important for pouches made with relatively inextensible films and for slack pack pouches. Selection of the spring tensions is a matter of simple experimentation.

When the flowable material being packaged is hot, the tubular film tends to be less easily controlled. The constraint roller assemblies 81 and 82 are useful in helping to eliminate air from the pouches, relieving the hydraulic stress when the jaws are closed, alleviating the problems of hang-up with fat or small pouches and for controlling pouch slackness. The positioning of the stops 83 will control the extent of slackness in the pouch, as will be apparent to one skilled in the art.

Figure 2A:
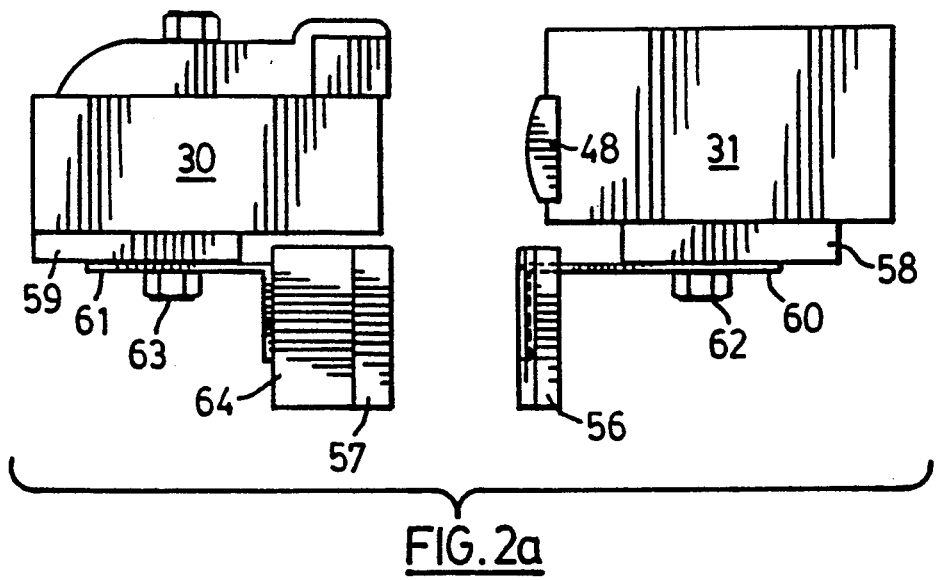
FIGS. 2a and 2b show side and plan views of the heat sealing jaws with depending lower walls.
Figure 2B:
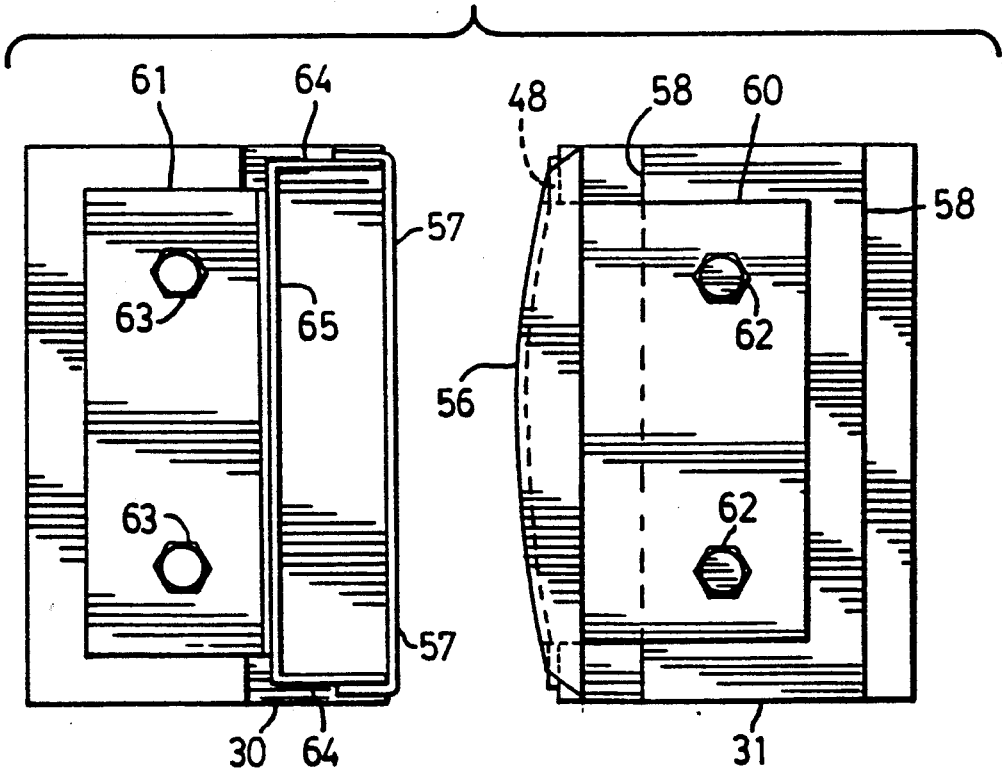

The lower jaw walls 56 and 57, which depend from jaws 31 and 30 respectively, are shown more clearly in FIGS. 2a and 2b. In FIGS. 2a and 2b, on the bottom of jaws 31 and 30 are blocks 58 and 59 respectively. L-shaped hanger 60 is attached to block 58 by bolts 62. Lower jaw walls may be attached to jaws by other parts of the form, fill and seal machine, as long as the lower wall jaws move in concert with jaws 30 and 31. Convex lower jaw wall 56, which is made of metal, is welded to hanger 60. Lower wall 56 is convex along its entire length. The degree of convexity is exaggerated in FIG. 2b, for a clearer understanding of the invention. L-shaped hanger 61 is attached to block 59 by bolts 63. L-shaped hanger 61 is also attached to U-shaped piece 65. The ends of U-shaped piece 65 are support wings 64. Lower jaw wall 57 is made of elastomeric sheet and is attached to support wings 64 by clamps (not shown). Lower jaw wall 57, i.e. the elastomeric sheet, is held under tension between support wings 64. As indicated hereinbefore the tension is preferably from about 0.8 to 5.5 N/cm width, especially 1.0 to 5.0 N/cm. The degree of tension is determined experimentally. The degree of tension may depend in part on the viscosity or lumpiness of the material being packaged. For example, more tension would be required when packaging taco meat than when packaging chocolate sauce. In operation, when jaws 30 and 31 are moved towards one another, lower jaw walls 56 and 57 also move towards one another. As lower jaw walls 56 and 57 close together, material 99 inside tube 19 is squeezed and partly flattened, depending on the viscosity of the material. Air is then forced upwards. Although not wishing to be bound by any theory, it is believed that the convexity of lower wall 56 allows flowable material 99 in the tube to be pushed first laterally and then upwardly, thus expelling air from the corners of the pouch-to-be as well as from the centre.

It will be understood by those skilled in the art that the width of the lower jaw wall will depend in a large part on how far is the material/air interface below the heat sealing element.

The term "flowable material" does not include gases but encompasses materials which are flowable under gravity or may be pumped. Such materials include emulsions, e.g. ice cream mix; soft margarine; food dressings; pastes, e.g. meat pastes; peanut butter; preserves, e.g. jams; pie fillings; marmalade; jellies; dough; ground meat, e.g. sausage meat, taco meat; powders, e.g. gelatin powders; detergents; liquids, e.g. milk; oils; and granular solids, e.g. rice; sugar.

The present invention may be illustrated by reference to the following examples:

EXAMPLE I

A commercially available Prepac packaging machine with a constraint system was used to make pouches containing taco meat in a tube made from 414 mm wide polyethylene film. The pouch dimensions were 19.7 cm wide by 34.9 cm long by 53 mm thick, and the pouches had air therein. The volume inside the pouch was estimated to be about 85% of the estimated volume of pouches made with the above machine, without a constraint system. The machine was then modified so that lower jaw walls depended from heat sealing jaws. A first lower jaw wall was constructed from stainless steel. The convexity of the lower jaw wall had an arc such that the centre of the arc stood about 7 mm proud of a line joining the ends of the arc. The first lower jaw had a width of 8.3 cm and a length of 18.5 cm. The second lower jaw was made from elastic waistband material, about 1.5 mm thick, about 18.5 cm long and 8.3 cm wide. The elastic waistband material was tensioned between steel support wings. The lower jaw walls were adjusted so that when the heat sealing jaws were closed the centre of the first lower jaw impressed the elastic material by about 8 mm. Pouches, 19.4 cm wide by 37.1 cm long by 41.5 mm thick were made, with substantially no air in them. The volume was about 70% of the volume of pouches made without the constraint system or the lower jaw walls.

A similar experiment was performed with film 530 mm wide and with jaw walls 25.0 cm in length and 14.0 cm in width. It was found that the radius of the arc of the first lower jaw wall had to be increased so that the convexity of the lower jaw wall had an arc such that the centre of the arc stood about 4 mm proud of a line joining the ends of the arc. When the radius of the arc was decreased there was a tendency for the pouches to "hang up", i.e. not to fall by gravity past the lower jaw walls.

Similar results have been obtained with the elastic being replaced with natural rubber, about 1.6 mm in thickness.

I claim:

1. A form, fill and seal machine for making material-filled slack pouches, including forming means for shaping a flat web of thermoplastic film into a vertically disposed, horizontal elongated cross-section, continuous tube;

gripping means for clamping and closing said tube over the length of said horizontal elongated cross-section, comprising a first jaw on one side of said tube and a second jaw on the opposite side of said tube, at least one of said jaws being capable of moving toward and away from the other of said jaws;

sealing means on said first jaw for heat sealing and severing the thermoplastic film to form a top seal of a previously-filled pouch and a bottom seal of a next-to-be-filled pouch; and filing means for delivering a product material into the next-to-be-filled pouch, wherein the improvement comprises:

one of said jaws having a convex wall member facing said tube below said heat sealing means, said wall member being convex about a vertical axis; and the other of said jaws having a wall member adapted to cooperate with said convex wall member, comprising a horizontally disposed length of elastomeric sheet held under tension, each of said wall members having height of from 5 to 20 cm and cooperating to squeeze the tube to expel air from a pouch prior to sealing.

2. A machine as recited in claim 1, wherein the elastomeric sheet comprises pure gum rubber.

3. A machine as recited in claim 1, wherein the elastomeric sheet is held under tension of from 0.8 to 5.5 N/cm of length of elastomeric sheet.

4. A machine as recited in claim 1 wherein the elastomeric sheet has a thickness of from 1 to 6 mm.

5. A machine as recited in claim 1, wherein the elastomeric sheet has a modulus of elasticity of from 0.7 to 1.8 N/cm/cm of length of elastomeric sheet.

6. A machine as recited in claim 1, wherein the improvement further comprises constraining means below said wall members, for controlling expansion of said tube under expansive pressure of product prior to clamping and closing of the tube.

7. A machine as recited in claim 6, wherein the constraining means comprises a stationary, vertical roller assembly on one side of said tube, further comprising a plurality of horizontal, cylindrical rollers, and a moveable roller assembly on the other side of said tube, comprising a plurality of horizontal, cylindrical rollers, said moveable roller assembly adapted for movement toward and away from said stationary roller assembly and said movement governed by springs adapted to bias said moveable roller assembly against the tube.

8. A process for making material-filled slack pouches, using a vertical form, fill and seal machine comprising the steps of:

(i) shaping a flat web of thermoplastic film into a vertically disposed, horizontal elongated cross-section, continuous tube;

(ii) closing said tube over the length of said elongated cross-section with an assembly comprising a first jaw on one side of said tube and a second jaw on the opposite side of said tube, at least one of said jaws having a heat sealing element and being capable of moving toward and away from the other of said jaws, one of said jaws having a convex wall member facing said tube below said heat sealing element, said convex wall member being convex about a vertical axis; and the other of said jaws having a wall member adapted to cooperate with said convex wall member, comprising a horizontally disposed length of elastomeric sheet held under tension, each of said wall members having height of from 5 to 20 cm; by causing said jaw wall members to squeeze the tube thereby expelling air from a previously-filled pouch until the film is clamped between said jaws;

(iii) heat sealing the thermoplastic film to form a top seal of the previously-filled pouch and a bottom seal of a next-to-be-filled pouch;

(iv) separating the previously-filled pouch from the next-to-be-filled pouch by severing the film between the top seal and the bottom seal;

(v) removing the previously-filled pouch and advancing the film downward;

(vi) delivering a product material into the next-to-be-filled pouch such that air is present in the tube above the product material and below the heat sealing element; and (vii) sequentially repeating steps (i)–(vi).

* * * * *